(12) United States Patent
Wachi

(10) Patent No.: US 7,655,172 B2
(45) Date of Patent: Feb. 2, 2010

(54) METHOD OF MANUFACTURING A GOLF BALL

(75) Inventor: Toshiro Wachi, Chichibu (JP)

(73) Assignee: Bridgestone Sports Co., Ltd., Tokyo (JP)

(*) Notice: Subject to any disclaimer, the term of this patent is extended or adjusted under 35 U.S.C. 154(b) by 48 days.

(21) Appl. No.: 11/760,256

(22) Filed: Jun. 8, 2007

(65) Prior Publication Data

US 2008/0303190 A1 Dec. 11, 2008

(51) Int. Cl.
*B29B 7/00* (2006.01)
(52) U.S. Cl. .................................. 264/328.7
(58) Field of Classification Search ............... 264/328.7
See application file for complete search history.

(56) References Cited

U.S. PATENT DOCUMENTS

| | | | | |
|---|---|---|---|---|
| 696,353 A | * | 3/1902 | Richards | ..................... 473/368 |
| 3,671,621 A | * | 6/1972 | Fukuoka et al. | ............. 264/244 |
| 4,698,001 A | * | 10/1987 | Vismara | ...................... 425/4 R |
| 6,033,724 A | * | 3/2000 | Molitor | ...................... 427/135 |
| 2001/0008320 A1 | * | 7/2001 | Scolamiero | ................. 264/250 |
| 2001/0011046 A1 | * | 8/2001 | Ichikawa et al. | ............ 473/371 |
| 2001/0026027 A1 | * | 10/2001 | Nesbitt | ...................... 264/40.1 |

FOREIGN PATENT DOCUMENTS

JP 51-118535 A 10/1976
JP 8-322966 A 12/1996

\* cited by examiner

*Primary Examiner*—Joseph S. Del Sole
*Assistant Examiner*—Jeremiah Smith
(74) *Attorney, Agent, or Firm*—Sughrue Mion, PLLC

(57) ABSTRACT

The present invention provides a method of manufacturing golf balls having a rubber core of at least one layer and a cover of at least one layer which encloses the rubber core, which method includes the step of molding at least one layer of the rubber core by directly injecting a rubber composition into a spherical cavity and vulcanizing the injected composition. This process enables the sphericity of the rubber core to be enhanced, the rubber materials to be used without waste, and balls of an excellent scuff resistance to be obtained.

6 Claims, 4 Drawing Sheets

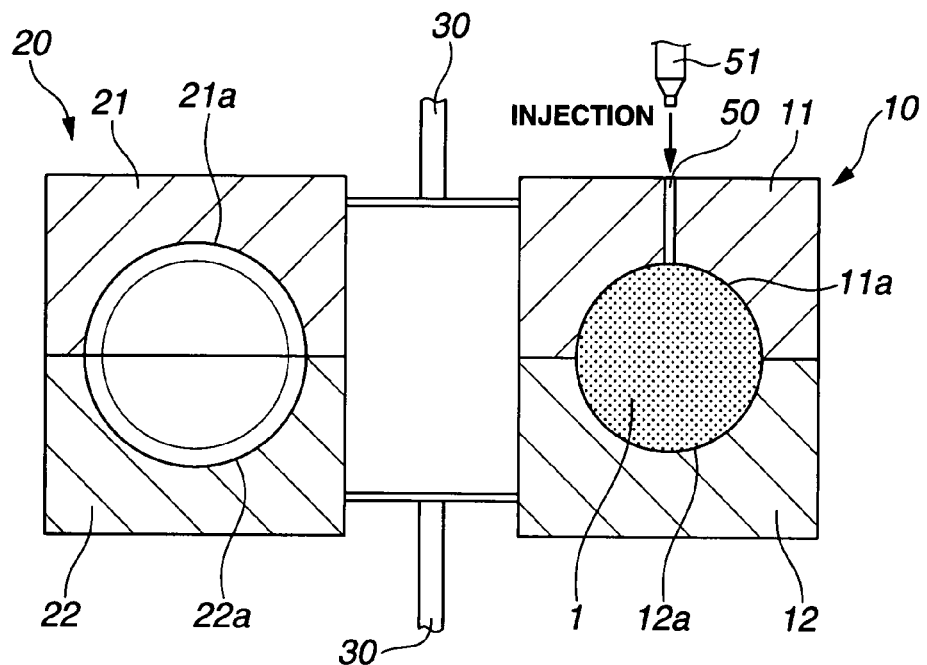
FIG.1
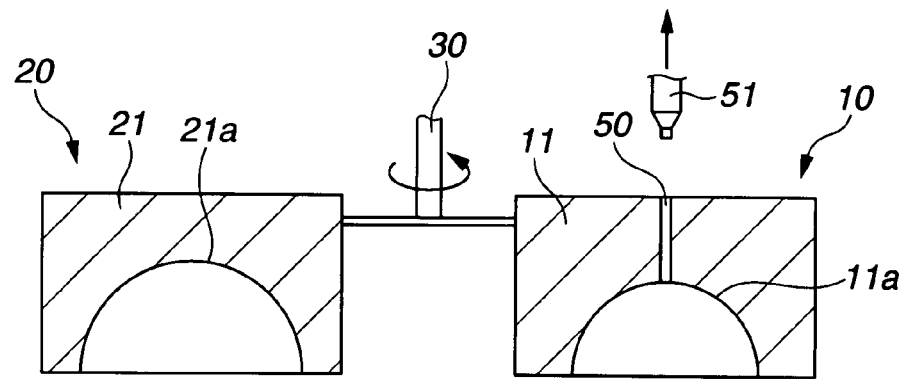
FIG.2
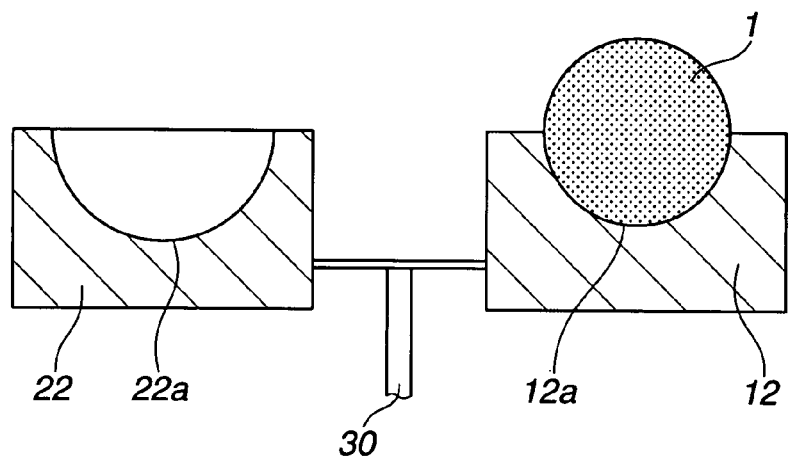

METHOD OF MANUFACTURING A GOLF BALL

BACKGROUND OF THE INVENTION

The present invention relates to a method of manufacturing golf balls having a rubber core of one or more layer and a cover of one or more layer which encloses the core. More specifically, the invention relates to a method of manufacturing golf balls which is able to increase the sphericity of the rubber core and can use the core-forming rubber material without waste.

Generally, to mold a golf ball core, unvulcanized rubber is formed into a slug of a fixed weight by way of an extrusion step. The slug is then inserted into a vulcanizing mold, where it is subjected to vulcanization under pressure, thereby giving a rubber material in the form of a sphere. When a rubber sphere of two or more layers is produced by pressure vulcanization, it is common to pressure-vulcanize the inner rubber layer and subsequently carry out a step in which the inner rubber layer is enclosed by unvulcanized rubber in the form of hemispheres, following which the latter is subjected to vulcanization under applied pressure so as to create an outer rubber layer (envelope layer).

The following method is generally used to then render the above rubber sphere into a golf ball. That is, the core of one or more layer is set within a mold having dimple-forming features. A cover material is subsequently injection-molded over the core while the core is held by support pins or the like. After cooling, the molded body is removed from the mold, then stamped and clear-coated.

However, when compression-molding and vulcanizing the inner rubber layer (inner core layer) by the above method, it is necessary to insert and vulcanize under pressure an amount of rubber material which is greater than the mold volume, causing flash to form at the mold parting plane, as a result of which a pressurized condition is maintained. A deflashing and trimming step is required to remove the flash, but such a step inevitably results in a decline in sphericity and wasteful use of the material in those areas that become flash. Moreover, to provide the core with a layer construction, as noted above, unvulcanized rubber shaped into hemispheres must be furnished beforehand, thus increasing the number of operations. Furthermore, given the need to separately fashion such materials for the inner core layer and the outer core layer, dust and debris tend to adhere to the surfaces of the inner core layer and the outer core layer, resulting in a bond of inadequate strength between the two core layers.

Similarly, the complete formation of two or more cover layers (where "cover layer" refers generally to, for example, an envelope layer, intermediate layer and outermost layer) requires that, in the course of such formation, hemispherical sections be created for each layer, thus increasing the number of operations. Moreover, because the hemispherical sections are separately fabricated for each layer, the adherence of dust and debris weakens the strength of bonded areas therebetween.

Known methods of manufacturing golf balls include those disclosed in JP-A 8-322966 and JP-A 51-118535, although the core material is not injection-molded in these prior-art methods.

SUMMARY OF THE INVENTION

It is therefore an object of the present invention to provide a golf ball manufacturing method which can enhance the sphericity of the rubber core, which is capable of using rubber materials without waste, which is able to increase the production efficiency when the core is formed as a plurality of layers by consecutively molding a multilayer core in a series of operations, and which is capable of producing golf balls having an excellent scuff resistance.

Accordingly, the invention provides the following methods of manufacturing golf balls.

(I) A method of manufacturing a golf ball having a rubber core of at least one layer and a cover of at least one layer which encloses the rubber core, which method includes the step of molding at least one layer of the rubber core by directly injecting a rubber composition into a spherical cavity and vulcanizing the injected composition.

(II) A method of manufacturing a golf ball composed of a rubber core having a two-layer construction made up of an inner layer and an outer layer and a cover of at least one layer that encloses the rubber core using at least two vertically separating two-part molds of differing size cavities, each mold being composed of a top half and a bottom half, which are installed in such a way that the top mold halves are horizontally rotatable together and the bottom mold halves are horizontally rotatable together, which method includes the steps of: (1) injecting an inner core layer-forming rubber composition into the cavities of a first top mold half and a first bottom mold half and vulcanizing the composition so as to form the inner core layer; and (2) rotating to a predetermined position a second top mold half or second bottom mold half having a cavity that is larger than the cavity of the first top mold half or first bottom mold half, placing the inner core layer formed in step (1) within the second top mold half or second bottom mold half, and injecting and vulcanizing an outer core layer-forming rubber composition so as to form the outer core layer over the inner core layer one hemisphere at a time.

(III) A method of manufacturing a golf ball composed of a core and a cover of at least one layer which encloses the core using at least two vertically separating two-part molds of differing size cavities, each mold being composed of a top half and a bottom half, which are installed in such a way that the top mold halves are horizontally rotatable together and the bottom mold halves are horizontally rotatable together, which method includes the steps of: (1) injecting a rubber composition into the cavities of a first top mold half and a first bottom mold half and vulcanizing the composition so as to form the core, and (2) rotating to a predetermined position a second top mold half or second bottom mold half having a cavity that is larger than the cavity of the first top mold half or first bottom mold half, placing the core formed in step (1) within the second top mold half or second bottom mold half, and injection-molding a resin material so as to form the cover over the core one hemisphere at a time.

That is, the golf ball manufacturing method of the invention molds at least one rubber core layer by injecting a rubber composition into a hemispherical cavity and vulcanizing the injected composition. This method eliminates the need to remove the flash that forms when rubber material which has been vulcanized is then subjected to thermal compression to a predetermined size, and thus avoids the inevitable decline in core sphericity associated with such a deflashing operation. Moreover, there is no wasteful use of rubber material in areas that become flash, thus enabling a good operational efficiency and reduced operating costs to be achieved.

Hence, in the present invention, by injection-molding the core material, it is possible to simplify the production steps, enhance the sphericity, and apply a larger force during molding of the core than when the core is molded from a slug. As a result, defects caused by the presence of air pockets during molding of the core can be minimized, in addition to which the durability of the ball can be improved and hardness defects reduced. The manufacturing method of the invention also enables the core hardness to be easily increased.

Moreover, by using at least two vertically separating two-part molds of differing size cavities, each mold being composed of a top half and a bottom half, that are installed in such a way that the top mold halves are horizontally rotatable together and the bottom mold halves are horizontally rotatable together, the manufacturing method of the invention is able to consecutively carry out a series of injection-molding operations so as to form a golf ball construction composed of a core together with an envelope layer and/or a cover. First, a core-forming rubber composition is injected then vulcanized in a first pair of mold halves so as to create a core. Next, a second pair of mold cavities having cavities which are larger than the cavities of the first pair of mold halves are rotated, the top half being rotated separately from the bottom half, and a rubber material or resin material is injected into the cavity of the second mold. It is possible in this way to avoid having to remove a core or a sphere composed of a core surrounded by an envelope layer from one mold and transfer it to another mold, thus enabling reliable prevention of a decrease in bond strength between the sphere and cover due to the adherence of dust or debris to the surface of the sphere.

BRIEF DESCRIPTION OF THE DIAGRAMS

FIG. 1 is a schematic cross-sectional view of a golf ball manufacturing method according to one embodiment of the invention, showing the mold used when injection-molding a core-forming rubber composition.

FIG. 2 is a schematic cross-sectional view showing the mold of FIG. 1 in a vertically separated state.

DETAILED DESCRIPTION OF THE INVENTION

Figure 3:
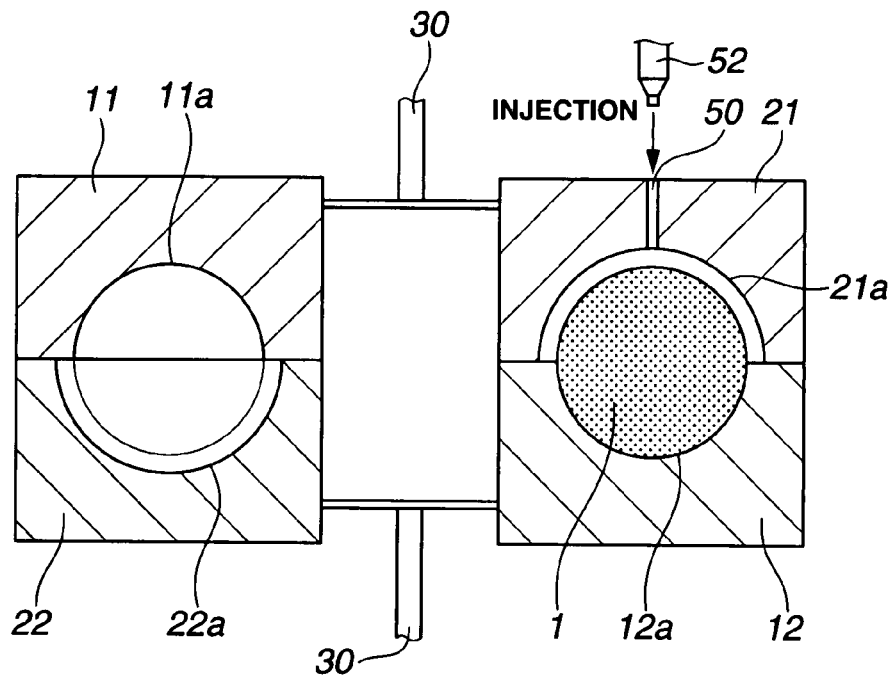
FIG. 3 is a schematic cross-sectional view of a golf ball manufacturing method of the same embodiment, showing the arrangement of molds used when injection-molding over the core a molding material for a hemispherical envelope layer (top side).

The invention is described in detail below in conjunction with the accompanying diagrams.

FIGS. 1 to 5 illustrate a golf ball manufacturing method according to one embodiment of the invention. In FIG. 1, a first mold 10 and a second mold 20 are arranged with the top halves of the respective molds coupled together and the bottom halves of the molds coupled together by a rotational mechanism having a rotary shaft 30 in such a way that the top halves are horizontally rotatable together and the bottom halves are horizontally rotatable together. The first mold 10 is composed of a top half 11 and a bottom half 12, each having a hemispherical cavity 11a and 12a, respectively. A rubber composition inserted by a metering extruder 51 passes through an injection gate 50 and is injected into the hemispherical cavities 11a and 12a, where it vulcanizes, thereby forming a spherical core 1. The second mold 20 is composed of a top mold half 21 and a bottom mold half 22, each having a hemispherical cavity 21a and 22a, respectively, by means of which an envelope layer for enclosing the core can be formed. As used herein, the term "envelope layer" applies to all covering layers, of which there may be one or more, that enclose the center core of the ball. Examples of envelope layers include rubber outer core layers and rubber or resin cover layers (also referred to as "intermediate layers" and "outermost layers").

The material making up the molds proper is not subject to any particular limitation. For example, suitable use may be made of carbon steel, beryllium copper, aluminum alloy, tungsten heavy alloy, nickel-molybdenum steel, chromium-molybdenum steel, stainless steel, or ceramic.

The molds used in the invention are characterized by having two or more sets of cavities of differing size. The shapes of the cavities, while not subject to any particular limitation, are suitably selected in accordance with the shape of the core or the sphere composed of the core enclosed by one or more envelope layer. For example, a cavity diameter which matches the core diameter will preferably be from 18 to 41 mm, more preferably from 25 to 40 mm, and even more preferably from 31 to 38 mm. Cavities used in the production of a sphere composed of a core enclosed by one or more envelope layer are set to a diameter which is preferably from 0.2 to 4.0 mm larger, more preferably from 0.5 to 3.0 mm larger, and even more preferably from 0.6 to 1.0 mm larger, than the cavity of the core or of the sphere prior to injection.

In the molds shown in FIGS. 1 to 5, an injection gate 50 is disposed within one of the mold cavities. The rubber composition is injection-molded through this gate and into the mold by a metering extruder filled with the rubber composition. Although details are not shown in the diagrams, use may be made of a system of gates, runners and sprues such as is commonly employed in molds.

Although not shown in the diagrams, the injection gate 50 has a diameter which may be suitably selected according to the rubber or resin material used and the injection pressure. The gate diameter is preferably from 0.2 to 2.0 mm, more preferably from 0.4 to 1.0 mm, and even more preferably from 0.8 to 1.0 mm. The number of gates is preferably at least two, more preferably at least three, and even more preferably at least five. The number of gates used when injecting a rubber material is preferably at least two, even more preferably at least three, and most preferably at least four.

No particular limitation is imposed on the positions of the injection gates. However, in the practice of the invention, because the top mold halves and the bottom mold halves are each separating and the molding materials are consecutively injection-molded while the mold halves rotate horizontally, it is preferable to position the injection gates vertically on the cavity walls, in the manner of the injection gate 50 in FIGS. 1 to 5, for example.

It is preferable that dimple-forming projections be formed in the mold used for the sphere that is to be ultimately obtained. This mold is preferably formed in such a way that dimples are positioned on the parting line of the golf ball.

The core used in the invention is made of a rubber composition. The rubber base therein is not subject to any particular limitation and may be any core material ordinarily used in golf balls. A polybutadiene having a cis-1,4 bond content of preferably at least 40%, more preferably at least 60%, and even more preferably at least 90%, is especially desirable. The polybutadiene is preferably a polybutadiene synthesized using a rare-earth catalyst, and most preferably a polybutadiene synthesized using a neodymium catalyst. It is also preferable to use a modified polybutadiene rubber obtained by subsequent reaction with a terminal modifier. The foregoing rubber component is preferably a polybutadiene having a cis-1,4 bond content of at least 60% and a 1,2-vinyl bond content of not more than 2%. A core formed using the above material has good rebound properties and enables the golf ball productivity to be enhanced.

The injection-molding temperature for the above rubber composition is set to preferably between 130 and 200° C., more preferably between 140 and 180° C., and even more preferably between 150 and 160° C. The molding period is preferably set to between 5 and 40 minutes. At a heating temperature below 130° C., vulcanization may not go to completion, possibly resulting in a core having an insufficiently crosslinked structure and thus a low resilience. On the other hand, a molding temperature above 200° C. may cause scorching (early vulcanization) to occur, as a result of which it may be impossible to maintain a properly fluid state.

Figure 7A:
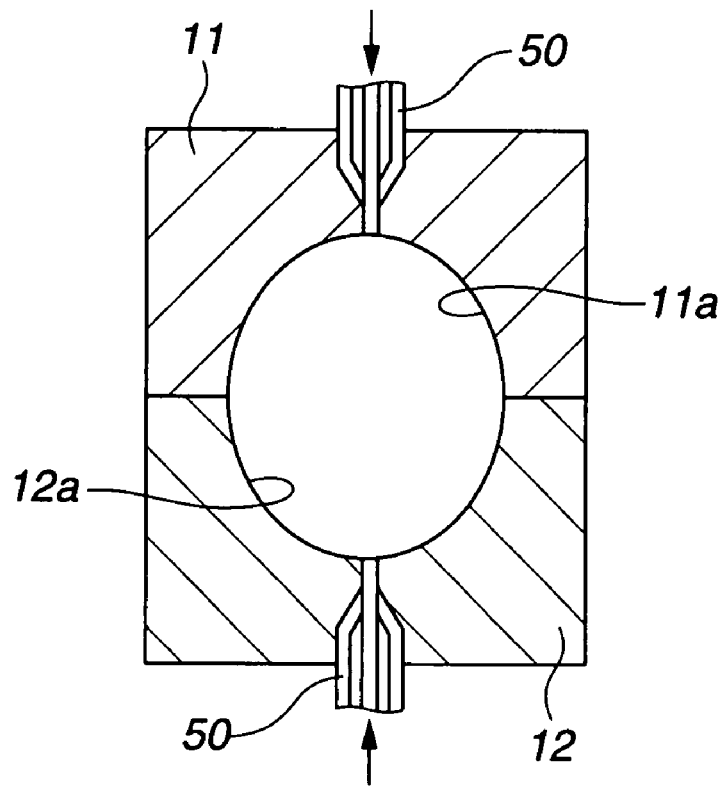
FIG. 7 shows schematic cross-sectional views illustrating the injection and vulcanization of a core using a mold having a spheroidal cavity.
Figure 7B:
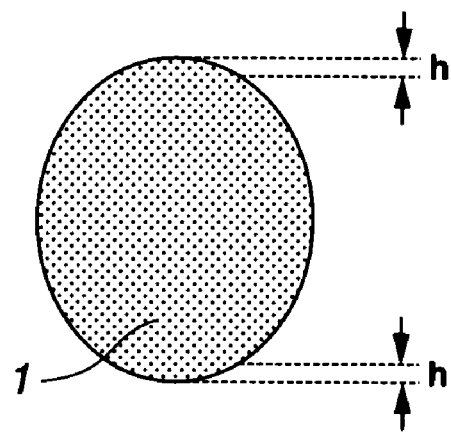

The first mold 10 has, owing to the combination of hemispherical cavities 11a and 12a, a spherical cavity that matches the shape of the core. However, the core shape may be molded beforehand into a spheroidal shape that takes into account deformation caused by the injection pressure when an envelope layer is injection-molded over the core. Even if a truly spherical core is used, in the course of injection-molding the envelope layer-forming material, the core near the injection gates will deform slightly due, for example, to the injection pressure of the molding material, as a result of which the sphericity of the core will be lost. To have the core after the envelope layer material has been molded be truly spherical, it is desirable to use an eccentric core having a shape that factors in core deformation due to the injection pressure of the molding material. Specifically, as shown in FIG. 7A, use may be made of mold halves 11 and 12 having hemispheroidal cavities 11a and 12a in order to pre-mold a spheroidal core which is thicker in areas that correspond to where the sprues are situated in the mold (top and bottom mold halves). The rubber core 1 molded using these molds 11 and 12 has a spheroidal shape in which, as shown in FIG. 7B, both polar ends are formed so as to be between 0.1 and 0.5 mm thicker than in a true sphere. The extent of this thickening is represented in the diagram by the reference symbol h. By thus furnishing a spheroidal core, when an envelope layer material is subsequently injected, the spheroidal shape will deform under the injection pressure, enabling the core over which the molding material is applied to be finished to a shape that is truly spherical. The envelope layer-enclosed core can be molded in this way into a true sphere, thus making it possible to enhance the symmetry of the ball as a whole, ensure the uniformity of flight, and improve the durability to impact.

In the present invention, the term "core" refers to the innermost portion of a golf ball. In cases where the core has an inner core layer and an outer core layer, the term "core" shall be understood to denote the inner core layer which serves as a center core.

In the invention, as shown in FIG. 1, a first pair of mold halves 11 and 12 are joined together and a rubber composition is injected into the mold cavities 11a and 12a thereof, thereby injection-molding a core 1. Because the core (center core) is manufactured by injection-molding the rubber composition into the cavities 11a and 12a in this way, the parting planes of the mold halves can be closed more tightly than when the core is molded from the state of a slug. As a result, little flash forms, making it possible to reduce the amount of rubber composition used and enabling the sphericity to be increased.

After the rubber composition has been molded and vulcanized, any flash that remains between the mold halves 11 and 12 is removed. Next, as shown in FIG. 2, the two mold halves 11 and 12 are separated in such a way as to leave the core within the cavity 12a of the first bottom mold half 12, following which the first top mold half 11 and a second top mold half 21 are rotated in unison through a predetermined angle by a rotary shaft 30, thereby pairing together, as shown in FIG. 3, the cavity 21a of the second top mold half 21 with the cavity 12a of the first bottom mold half 12.

Figure 4:
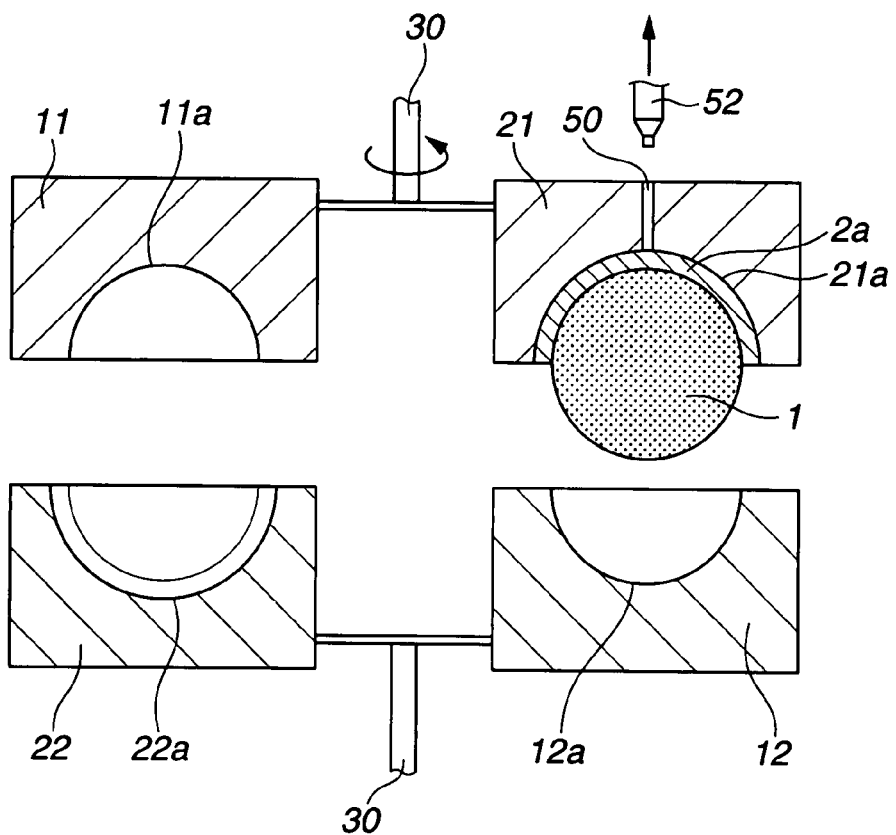
FIG. 4 is a schematic cross-sectional view showing the mold of FIG. 3 in a vertically separated state.
Figure 5:
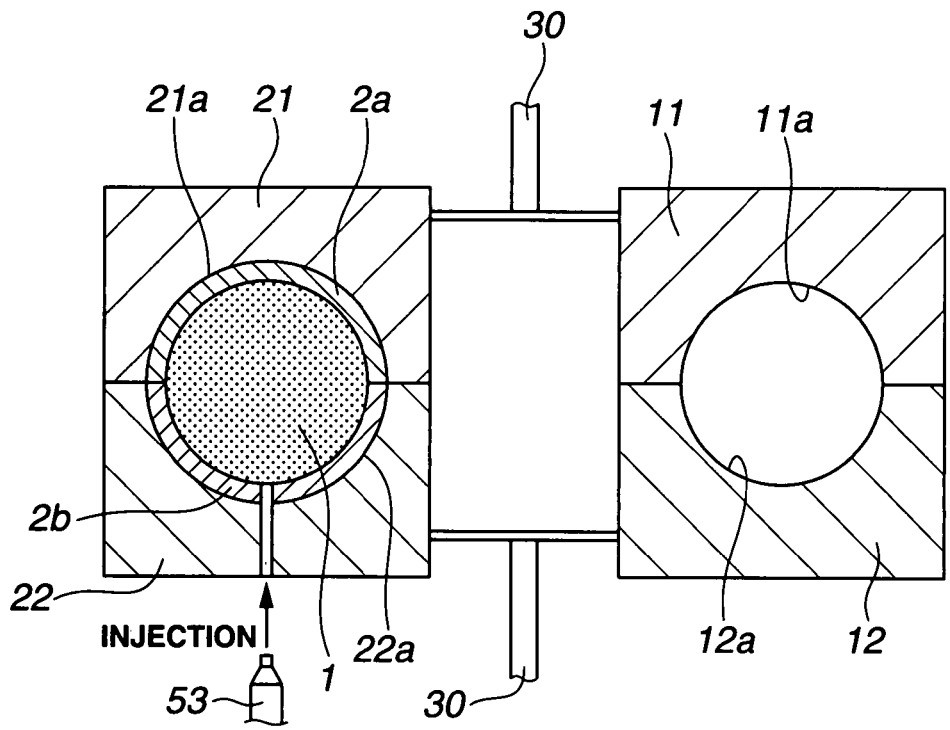
FIG. 5 is a schematic cross-sectional view of a golf ball manufacturing method of the same embodiment, showing the arrangement of molds used when injection-molding over the core a molding material for a hemispherical envelope layer (bottom side).

As shown in FIG. 3, in a state where the cavity 21a of the second top mold half 21 has been paired with the cavity 12a of the first bottom mold half 12, the envelope layer-forming material for a hemispherical portion is injection-molded into the second top mold half 21 from an injection gate 50. Next, after injection molding, as shown in FIG. 4, the mold halves 12 and 21 are separated in such a way as to leave the sphere within the cavity 21a of the second top mold half 21, following which the first top mold half 11 and the second top mold half 21 are rotated in unison through a predetermined angle by the rotary shaft 30, thereby pairing together, as shown in FIG. 5, the second top mold half 21 and the second bottom mold half 22. The envelope layer-forming material for the remaining hemispherical portion is then injection-molded into the cavity 22a of the second bottom mold half 22.

As noted above, the term "envelope layer" signifies various intermediate layers and outermost layers which enclose the core, a meaning that encompasses also the outer core layer which is a part of the core. The materials making up these layers may be rubber-based materials or various known resin materials.

The rubber-based materials may be commonly used core materials or cover materials, and may even be the same material as the core material described above. The resin materials are not subject to any particular limitation, although the use of a resin material composed primarily of a thermoplastic resin or a thermoplastic elastomer which contains short organic fibers is especially preferred. Such thermoplastic resins or thermoplastic elastomers are exemplified by ionomer resins, thermoplastic polyester elastomers, olefin-unsaturated carboxylic acid copolymers, olefin-unsaturated carboxylic acid-unsaturated carboxylic acid ester copolymers, and metal ion neutralization products of such copolymers. The short organic fibers may be suitably selected from among, for example, binary copolymers composed of a polyolefin component and a polyamide component, and binary copolymers composed of a polyolefin component and a polyamide component in the form of nylon fibers.

The molding temperature for the above resin material, while not subject to any particular limitation, is preferably set to from 130 to 200° C., more preferably from 140 to 160° C., and even more preferably from 145 to 155° C.

By having the releasability of the above-described molds increase in the following order: first top mold half 11, first bottom mold half 12, and second top mold half 21, the core and sphere can be transferred to the mold half on one side, enabling injection molding from the core to the cover to be consecutively carried out. It is preferable here to use a material which increases the mold releasability and to apply the material so that the thickness of the resulting film increases in the foregoing mold order. Such releasability-increasing materials are exemplified by fluorocarbon compounds, polyimide compounds, tungsten compounds and cobalt compounds. The use of a compound such as Teflon is preferred.

Alternatively, instead of a method which increases the releasability as described above, by using at the time of mold release a pin or air blower to push against the hemisphere within the mold half on the side where injection molding has not occurred, this mold half can be made to separate from the mold half on the side where injection molding has just occurred, enabling the spherical molded body to be mechanically held by the mold half on the injection molding side.

When such pins are used, gas venting may be carried out by utilizing gaps between the pins and the inner peripheral face of openings for the pins.

Moreover, in the practice of the invention, a core that has been prefabricated in another step or a sphere obtained by enclosing a core within an envelope layer may be set in the mold, and a new envelope layer formed thereabout. That is, a multilayer sphere may be obtained by starting production from a core or a sphere composed of a core enclosed by an envelope layer, and forming one or more envelope layer about the core or sphere.

Figure 6:
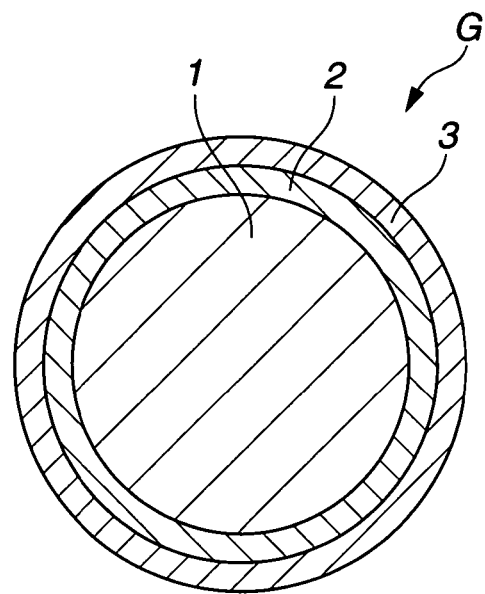
FIG. 6 is a schematic cross-sectional view of the multilayer golf ball obtained by the manufacturing method of the same embodiment.

The golf ball manufacturing method of the invention, by additionally pairing together mold halves having even larger cavities than the above-described mold cavities, is capable of forming a plurality of envelope layers or covers of differing thicknesses. By passing through the steps shown in FIGS. 1 to 5, an envelope layer 2 made of rubber or resin may be formed over the core 1. If necessary, another envelope layer (outermost layer) 3 may additionally be formed around the resulting sphere. In the latter case, the method of injection-molding the outermost layer 3, while not shown in the diagrams, may involve providing a top mold half and a bottom mold half with cavities even larger than the cavities used to form the envelope layer 2, and employing these mold halves for consecutive molding in a sequence similar to that used in the above-described method for injection-molding the envelope layer 2. Consequently, as shown in FIG. 6, a golf ball G having a construction of three or more layers can be obtained by the successive formation of an envelope layer 2 and an outermost layer 3 over a core 1.

As described above, in the inventive method of manufacturing golf ball, at least one rubber core layer is molded by directly injecting a rubber composition into the spherical cavity of a mold and vulcanizing. As a result, a high core sphericity can be maintained, the core durability can be enhanced and core hardness defects reduced, and a high productivity can be achieved.

Moreover, in the invention, two top mold halves (11 and 21) and two bottom mold halves (12 and 22) are coupled together by a rotary shaft. The core and one or more envelope layer enclosing the core can be consecutively formed by horizontally rotating in unison the bottom mold halves or the bottom mold halves so as to successively change the combination of a top mold half with a bottom mold half.

EXAMPLES

The following Examples of the invention and Comparative Examples illustrate but do not limit the invention.

Example 1

The rubber composition formulated as shown in Table 1 (parts by weight) was injected and vulcanized under the conditions indicated below, thereby forming an inner core layer and an outer core layer. More specifically, the core was formed by the method described below using the molds shown in FIGS. 1 to 5.

FIG. 1

An inner core layer-forming mold 10 composed of a first top half 11 having a top half cavity 11a and a first bottom half 12 having a bottom half cavity 12a, and an outer core layer-forming mold 20 composed of a second top half 21 having a top half cavity 21a and a second bottom half 22 having a bottom half cavity 22a were rotated through a predetermined angle by a rotary shaft. A rubber composition having the inner core layer formulation (parts by weight) shown in Table 1 was then injected by a metering extruder 51 into the inner core layer-forming mold 10 under the injection-molding conditions shown below (3) and vulcanized under the vulcanization temperature and time conditions shown below (4), thereby giving an inner core layer 1.

FIG. 2

The metering extruder 51 was withdrawn upward as indicated by the arrow and the mold 11 was opened. At this time, the inner core layer 1 remained in the first bottom mold half 12.

FIG. 3

The first top mold half 11 and the second top mold half 21 were rotated in unison through a predetermined angle by the rotary shaft 30, thereby pairing together the cavity 21a of the second top mold half 21 with the cavity 12a of the first bottom mold half 12.

FIG. 4

With the second top mold half 21 and first bottom mold half 12 paired as described above, the outer core layer material formulated as shown in Table 1 (parts by weight) was injection-molded into the second top mold half 21 under the injection-molding conditions shown below (3) by a metering extruder 52 and vulcanized under the vulcanization temperature and time conditions shown below (4), thereby giving an outer core layer which covered only the top half of the inner core layer 1. The metering extruder 52 was withdrawn upward as indicated by the arrow and the mold 12 was opened. The outer core layer remained within the second top mold half 21 together with the inner core layer.

FIG. 5

The second top mold half 21 and the first top mold half 11 were rotated in unison through a predetermined angle by the rotary shaft 30, thereby pairing the cavity 21a of the second top mold half 21 with the cavity 22a of the second bottom mold half 22. With the top and bottom mold halves thus paired and closed, the outer core layer material was injection-molded into the second bottom mold half 22 by the metering extruder 53 and vulcanized, thereby obtaining a two-layer core sphere composed of an inner core layer enclosed by an outer core layer (envelope layer).

Next, an ionomer resin (Himilan 1706, produced by DuPont-Mitsui Polychemicals Co., Ltd.) was used as the cover material to form a second covering layer (outermost layer cover) on the above sphere having a second core layer. Using this cover material, a cover having a thickness of 2.0 mm was injection-molded around the two-layer core having an inner layer and an outer layer. In addition, 432 dimples were molded onto the surface of the cover at the same time that the cover material was injection-molded. The resulting ball was then clear-coated.

Comparative Example 1

The rubber composition having the inner core layer formulation (parts by weight) shown in Table 1 was suitably masticated using a kneader or roll mill, then molded under pressure at 150° C. for 20 minutes and vulcanized to form an inner core layer. When the rubber-based envelope layer composition shown in Table 1 was a rubber material, the various ingredients were masticated on a roll mill, and subsequently molded into half-shells in a semi-vulcanized state. The half-shells were then placed over the above-described center core and molded under applied heat and pressure at 155° C. for 15 minutes, thereby giving a multi-layer solid core.

After molding the outer core layer, the same procedure was followed as in Example 1. That is, a second covering layer (outermost layer cover) was formed over the core while creating 432 dimples in the cover, following which the ball was clear-coated.

TABLE 1

|  | (parts by weight) | Example/Comparative Example |
|---|---|---|
| Inner core layer | 1,4-cis-Polybutadiene | 100 |
|  | Zinc acrylate | 10 |
|  | Dicumyl peroxide | 0.6 |
|  | Antioxidant | 0.1 |
|  | Zinc oxide | 40 |
| Outer core layer | 1,4-cis-Polybutadiene | 100 |
|  | Zinc acrylate | 25 |
|  | Dicumyl peroxide | 0.6 |
|  | Antioxidant | 0.1 |
|  | Zinc oxide | 40 |

Injection-Molding Conditions
(1) Diameter, Thickness:
  Inner core layer: diameter, 35.5 mm
  Sphere (inner core layer+outer core layer): diameter, 38.7 mm
  Cover: thickness, 2 mm
(2) Injection-Molding Weight:
  Inner core layer: 32 g
  Sphere (inner core layer+outer core layer): 9 g
(3) Injection-Molding Temperature and Time:
  50° C. for both inner core layer and outer core layer
  7 seconds for inner core layer, and 5 seconds for outer core layer
(4) Vulcanization Temperature and Time:
  Vulcanization (mold) temperature: 155° C.
  Vulcanization time: 7 minutes
  Trade names for the primary materials in Table 1 are as follows.
Polybutadiene: Produced by JSR Corporation under the trade name "BR 730"
Dicumyl peroxide: Produced by NOF Corporation under the trade name "Percumyl D"
Antioxidant: Produced by Ouchi Shinko Chemical Industry Co., Ltd. under the trade name "Nocrac NS-6"

Performance evaluations for the golf balls of Example 1 and Comparative Example 1 obtained by the manufacturing methods described above are shown in Table 2 below.

TABLE 2

|  | Example 1 | Comparative Example 1 |
|---|---|---|
| Diameter (mm) | 42.68 | 42.71 |
| weight (g) | 45.58 | 45.60 |
| Deflection (mm) | 2.98 | 3.00 |
| Initial velocity | 77.22 | 77.20 |
| Initial velocity (m/s) | 66.3 | 66.2 |
| Durability Cracking begins (shots) | 342 | 304 |
| to impact Cracking average (shots) | 403 | 383 |

Performance Evaluation (1) Deflection:
  The deflection when compressed under a final load of 130 kgf from an initial load of 10 kgf.

(2) Initial Velocity:
  The initial velocity when struck at 1,376 rpm, as measured with a USGA-type initial velocity measuring instrument.

(3) Durability on Impact:
  The durability to impact of a golf ball when repeatedly struck with a driver at a head speed of 45 m/s was determined. That is, using N=10 balls as the basis for evaluation in each example, the balls were repeatedly struck with a driver at a head speed of 45 m/s and the number of shots that had been taken with the first of the ten balls to crack when cracking occurred in that ball was indicated as the "Cracking begins" value for that example. The number of shots that had been taken with each individual ball when it first cracked was averaged for all ten balls and indicated as the "Cracking average" value for that example.

The invention claimed is:

1. A method of manufacturing a golf ball composed of a rubber core having a two-layer construction made up of an inner layer and an outer layer and a cover of at least one layer that encloses the rubber core using at least two vertically separating two-part molds of differing size cavities, each mold being composed of a top half and a bottom half, which are installed in such a way that the top mold halves are horizontally rotatable together and the bottom mold halves are horizontally rotatable together, said method comprising the steps of: (1) injecting an inner core layer-forming rubber composition into the cavities of a first top mold half and a first bottom mold half and vulcanizing the composition so as to form the inner core layer; and (2) rotating to a predetermined position a second top mold half or second bottom mold half having a cavity that is larger than the cavity of the first top mold half or first bottom mold half, placing the inner core layer formed in step (1) within the second top mold half or second bottom mold half, and injecting and vulcanizing an outer core layer-forming rubber composition so as to form the outer core layer over the inner core layer one hemisphere at a time, wherein the releasability between the core and mold halves is increased thus enabling injection molding of the inner and outer core layers to be consecutively carried out.

2. The golf ball manufacturing method of claim 1, wherein the rubber composition is molded at a temperature of between 130 and 200° C. for a period of between 5 and 40 minutes.

3. The golf ball manufacturing method of claim 1, wherein the material used in the core is a polybutadiene having a cis-1, 4 band content of at least 40%, which is synthesized using a rare-earth catalyst.

4. The golf ball manufacturing method of claim 1, wherein mold halves having hemispheroidal cavities are used when injection molding the core.

5. The golf ball manufacturing method of claim 1, wherein a cover is injection-molded around the two-layer core having an inner layer and an outer layer by a material of a thermoplastic resin and/or a thermoplastic elastomer, thereby to injection molding from the core to the cover consecutively.

6. The golf ball manufacturing method of claim 1, wherein the rubber core has a spheroidal shape having polar ends, which are formed so as to be between 0.1 and 0.5 mm thicker than a true sphere.

* * * * *